United States Patent [19]

Barrick

[11] Patent Number: 4,709,432
[45] Date of Patent: Dec. 1, 1987

[54] COMBINATION DEVICE FOR APPLYING TIRE CHAINS AND MOUNTING A JACK

[76] Inventor: Fred A. Barrick, 2091 SW. Tegart, Gresham, Oreg. 97030

[21] Appl. No.: 858,571

[22] Filed: Apr. 24, 1986

Related U.S. Application Data

[63] Continuation of Ser. No. 656,743, Oct. 1, 1984, abandoned.

[51] Int. Cl.$^4$ ............................ B25F 1/00; B60T 3/00
[52] U.S. Cl. ............................................. 7/100; 7/170; 81/15.8; 152/242; 188/32; 248/352; 248/357; 254/88
[58] Field of Search ............... 152/213 R, 213 A, 208, 152/239, 242; 81/15.8; 7/100, 170; 254/98, DIG. 1, 88; 238/14; 248/152, 346, 357, 352; 188/32; 211/23, 24, 49.1

[56] References Cited

U.S. PATENT DOCUMENTS

| | | | |
|---|---|---|---|
| 2,022,804 | 12/1935 | Garey | 81/15.8 UX |
| 2,532,149 | 11/1950 | Cone | 238/14 UX |
| 2,680,567 | 6/1954 | Steven | 238/14 |
| 3,876,173 | 4/1975 | Cline | 188/32 X |
| 4,513,800 | 4/1985 | Vossenkemper | 152/213 A |

Primary Examiner—Donald E. Czaja
Assistant Examiner—Thomas Bokan
Attorney, Agent, or Firm—Klarquist, Sparkman, Campbell, Leigh & Whinston

[57] ABSTRACT

An apparatus for aiding in the mounting of tire chains having a flat base and two upward projecting angle members positioned parallel is disclosed. The angle members have first and second apices respectively positioned relative to one another and the road surface such that an encroaching tire is first engaged across its width by a first apex. The tire is supported on both apices, sized and positioned such that a cross-link of a tire chain positioned therebeneath remains movable, so that a snug and uniform fit of a tire chain is achievable. The apparatus is also useful as a support base for a jack and as a wheel chock.

1 Claim, 5 Drawing Figures

COMBINATION DEVICE FOR APPLYING TIRE CHAINS AND MOUNTING A JACK

This application is a continuation of application Ser. No. 656,743, filed Oct. 1, 1984, now abandoned.

BACKGROUND OF THE INVENTION

This invention relates generally to tools for use by car and truck drivers in the mounting of tire chains and, more particularly, to such devices also useful for other purposes for supporting vehicle wheels to facilitate positioning of the chains.

Tire chains have commonly been mounted on tires by spreading the chain along the ground, driving the tire to be chained over the chain, and subsequently wrapping the chain around the tire and hooking the two end chain links to two fasteners. Getting a tight, square fitting of the chains and uniform spacing of the cross-links using a method is difficult, particularly for the inexperienced individual. The difficulty is primarily caused by the tire resting on at least one, and usually two, of the cross-links. Further, as the tire is initially moved over the chain, the cross-links generally move forward or become applied slightly, thus making it difficult to achieve a uniform spacing of the cross-links and a snug fit of the chain around the tire.

One well-known way to avoid this problem is elevating the tire. Since drivers often do not have access to a vehicle hoist, they can elevate the vehicle only by manually jacking up a corner or axle of the vehicle. Doing so is inconvenient as at least two corners or wheels of the vehicles must be jacked up one at a time. Frequently, a driver does not learn of the need to mount the chains until confronting an icy or muddy road. Such a surfce does not securely support a jack. Often it is necessry to chock the other wheels so that the vehicle does not roll while jacked up. This procedure is time-consuming, dirty, and dangerous to the installer.

Besides jacking the car up, attempts have been made to elevate a tire and thereby permit limited movement of the chain therebeneath. For example, one manufacturer provides an elongated plastic chain-carrying box having its two ends upwardly sloped to provide ramps so that a vehicle tire can be driven up onto a flat top of the box. The ramps are formed with horizontal cross ribs in an effort to provide traction to the tire and prevent the box from being pushed forward. A rectangular recess is provided across the top of the container to receive a cross-link of a tire chain. In operation, an operator inserts a cross-link in the rectangular recess and spreads the chain along the ground. The tire to be chained is driven up the ramp onto the box. The cross-link, which is now directly beneath the tire, is movable in the rectangular recess, thus permitting a tight, uniform fit of the chain around the tire. Such a device is limited in its use, however, as the combination chain container and vehicle support commonly has a two thousand pound weight limit, thus preventing its use by large vehicles such as trucks. Also, the plastic traction ribs are only marginally effective due to the height and steepness of the ramp and rounded shape of the ribs. Furthermore, the plastic material wears out and eventually cracks and breaks, making the device useless or at best hazardous.

Another device includes two short lengths of lumber, such as two two-by-fours, position parallel and nailed onto a plywood base at a spacing sufficient for positioning a cross-link of a tire chain therebetween. The operator spreads the chain out, placing a cross-link between the two lengths of lumber, and thereafter drives the tire to be chained onto the lengths of lumber. The cross-link is movable beneath the tire, and thus facilitates achieving a tight, uniform fit of the chain around the tire. This device almost invariably slides forward as the tire approaches, unless cleats or other traction means are provided on a lengthwise extension of the base for engaging the tire to prevent slippage. The two-by-four boards provide little traction, especially for wet tires.

Accordingly, there remains a need for a device that facilitates the mounting of tire chains which is safe, can withstand the weight of a heavy vehicle, and will not slide forward when contacted by an approaching tire.

SUMMARY OF THE INVENTION

One object of the invention is to provide a tire chain mounting device which is sturdy and compact.

Another object of the invention is to provide a tire chain mounting device which is safe to use.

Another object of the invention is to provide a tire chain mounting device which will not slide forward when contacted by an approaching tire.

To fulfill these objects, my invention is a device comprising a rigid flat base having a pair of parallel spaced members projecting upwardly therefrom and having an apex sized and positioned for transversely engaging the tread of an encroaching tire such that the device will not slide away from the tire. The projecting members are positioned such that a cross-linking member of a tire chain, positioned on the base in a space between the members, remains freely movable upon a tire resting on the projecting members.

In a preferred embodiment, the two projecting members comprise means defining angled surfaces affixed to the base such that each member in combination with the base forms a triangular shape which extends continuously transversely of the base. The projecting members are sized so that the area generally at the apex of the triangle is first contacted by the tread of the tire. The apex is acutely angled sufficiently to indent into the tire to provide sure traction to the tire and to aid the tire in rolling up onto the device.

The foregoing structure is much easier and safer to use than prior devices. Moreover, it has the advantage of being useful for additional purposes. Holes can be provided in the base for mounting the base of a jack on the base of the chain mounting device. With such device inverted, the projecting members serve to grip an icy or muddy road surface and thereby stabilize the jack. The preferred triangular shape of the projecting members reinforces the base and makes the device easy to clean after use. The device can also be used as a wheel chock by placing the bottom side of the base tangentially against a tire and wedging the device between the tire and the road surface, with one of the projecting members gripping the road.

The foregoing and other objects, advantages, and features of the invention will become more readily apparent from the following detailed description of a preferred embodiment which proceeds with reference to the drawings.

DETAILED DESCRIPTION

Figure 1:
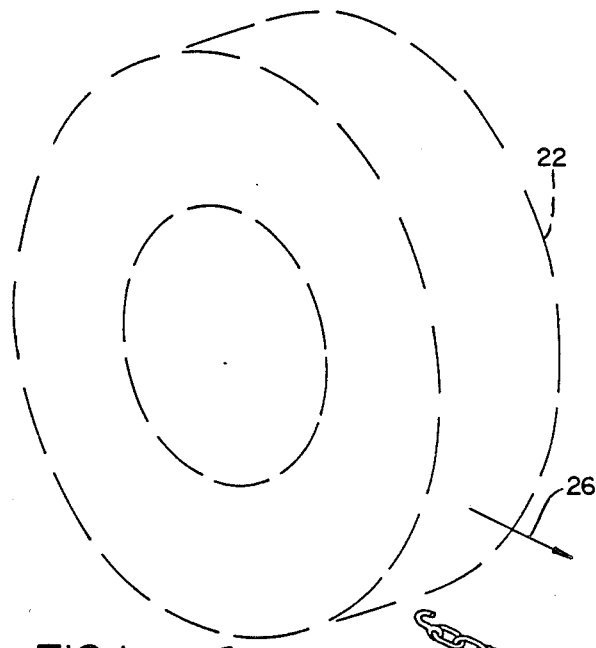
FIG. 1 is a perspective view of a preferred embodiment of the device in accordance with the invention, shown in position beneath a spread tire chain adjacent a vehicle wheel.
Figure 2:
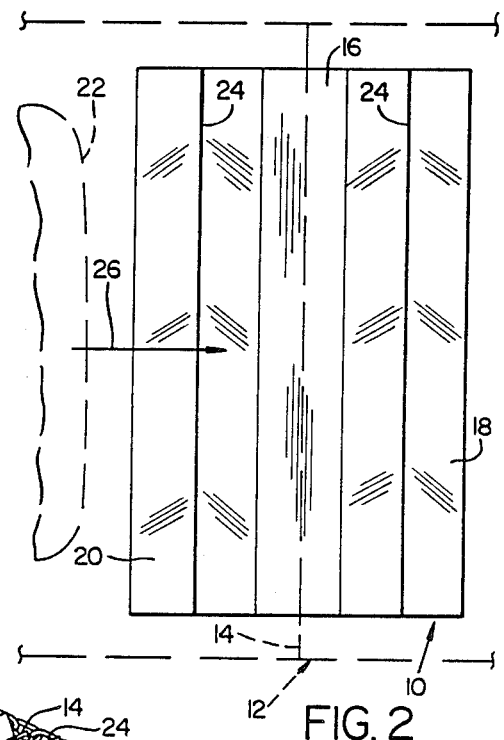
FIG. 2 is a top plan view of the device of FIG. 1.

With reference to FIG. 1, the chain mounting apparatus 10 is positioned beneath a conventional tire chain 12 having cross-links 14, spread upon a support surface such as a road. The apparatus 10 includes a flat rigid base 16 and a pair of parallel-spaced, upwardly-projecting, triangular member 18 and 20. One of the cross-links 14 is positioned between projecting members 18 and 20 for fitting beneath an approaching tire 22.

The flat rigid base 16 is made of sheet steel. Projecting members 18 and 20 are made of steel structural angle members, each positioned apex 24 up and welded along the distal ends of its legs to base 16. Members 18 and 20 are spaced for enough apart to permit free movement of a cross-link 14 therebetween, but not so far apart that tire 22 rests on cross-link 14.

Members 18 and 20 each provide surfaces angled from base 16 which define apices 24 along their uppermost portions. Members 18 and 20 are sized so that the apex is positioned such that approaching tire 22 will first contact device 10 at apex 24. Different devices 10 can be constructed with different apex 24 heights depending on the size of tire with which the device is designed to be used. For example, apex 24 must not be so high above the road surface that approaching tire 22 first contact device 10 along a face of projecting member 20, thereby sliding device 10 forward. Further, apex 24 must not be so low to the road surface that the tire 22, when resting on apices 24, also rests on cross-link 14.

Figure 3:
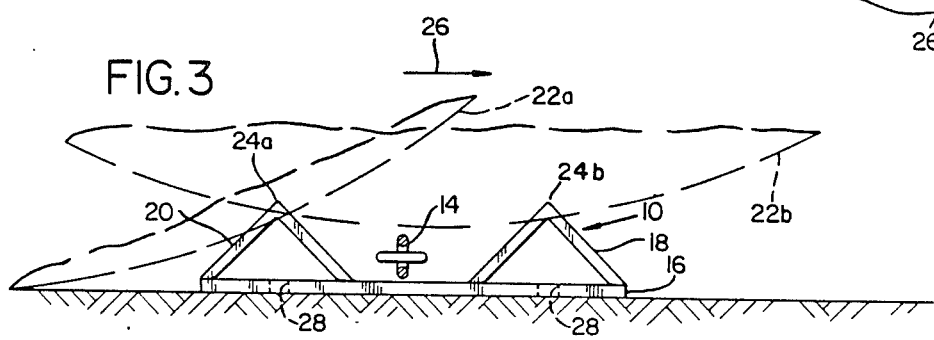
FIG. 3 is a side elevational view of the device of FIG. 1, showing a wheel first engaging and then supported on the device.

With reference to FIG. 3, tire 22, approaching in the direction of arrow 26, is first represented by dashed line 22a. The tire tread initially engages projecting member 20 of device 10 in the area generally at apex 24a. Apex 24a is shaped, sized and positioned to grip the tread of tire 22 along its entire width so as to prevent forward slippage of apparatus 10, and yet is not so sharp and protruding as to damage the tire. This gripping is accomplished by keeping the uppermost surfaces defining the apex purposely narrow or angular so that the apex digs into the tread of the tire to provide traction immediately upon contact and so that the device does not tend to slide forward in front of the tire. With the invention as shown, the tire will deform around apex 24a as opposed to flattening out on a top surface as would happen if a two-by-four were used as a projecting member. Tire 22 is thereby gripped and a resultant force projected downward thus preventing forward slipping of device 10.

The tire is shown in its final resting position by the dotted lines represented by 22b. At this point, tire chain 12 can be wrapped around tire 22. Cross-link member 14 is freely movable beneath tire 22 so that a uniform and snug fit of tire chain 12 is achievable.

Apices 24a, 24b are spaced above the base and close enough together to support the tire tread above the chain.

The required height of apices 24 above the ground is a function of the outside tire diameter, the distance between the apices, and the degree of tire deformation when resting on the apices. For example, a base six inches long and eight inches wide having one and a half inch angle members extending along opposite eight inch width sides of the base has apices three and five-eighths inches apart, which is suitable for six to eight inch wide car tires having outside diameters between twenty-six and twenty-eight inches. A base seven inches long and eight inches wide having a one and one half inch angle member suitable for six to eight inch wide tires having outside diameters between twenty-nine and thirty-one inches. A base eight inches long and ten inches wide having two inch angle members is suitable for nine to ten inch wide tires having outside diameters between thirty-one and thirty-nine inches. Accordingly, larger or smaller sized devices can be constructed to fit any size tire.

Figure 4:
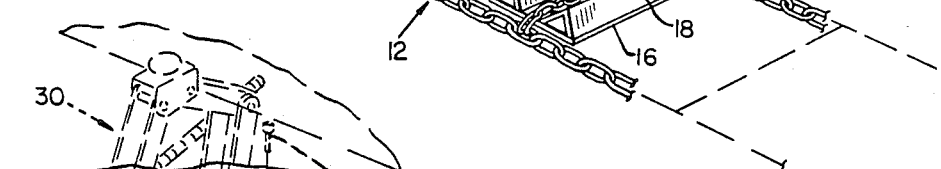
FIG. 4 is a perspective view of the device of FIG. 1 utilized as a base support for a jack.
Figure 4:
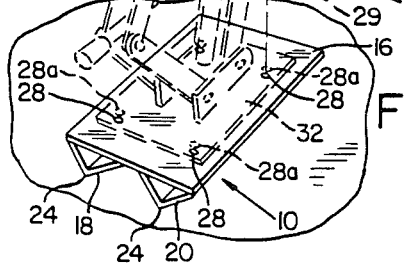

Four holes 28 are provided in base 16 beneath triangular projecting members 18 and 20 for affixing a jack to the underside of device 10. Holes 28 are arranged rectangularly to be alignable with corresponding holes in the base of a jack. With reference to Fig. 4, jack 30 is shown mounted to the underside of chain mounting apparatus 10. Holes 28a in the base 32 of jack 30 are aligned with the holes 28 in apparatus base 16. Removable pins 29 are provided to affix jack base 32 on base 16. Protruding members 18 and 20 dig into the ground therebeneath, permitting jack 30 to be utilized on a soft, icy, or muddy surface with greater stability than would otherwise be possible.

Figure 5:
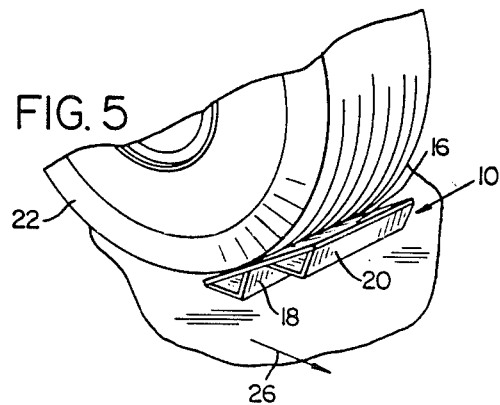
FIG. 5 is a side elevational view of the device of FIG. 1 being used as a wheel chock.

FIG. 5 shows apparatus 10 wedged between tire 22 and the road surface. The underside of base 16 is placed tangentially against the tread of tire 22 and a face of protruding member 18 is positioned against the road surface. A wheel chock is thereby provided which prevents tire 22, and thereby the vehicle, from rolling in direction 26.

It will be readily apparent that the parallel members 18 and 20 are so disposed that they will nest together when a pair of apparatus are placed together with one side of their bases in facing relation, with one parallel member 18, 20 of one of the pair of apparatus disposed between adjacent to the two parallel members of the other of the pair of apparatus.

Having illustrated and described a preferred embodiment of my invention and various uses thereof, it should be apparent to those skilled in the art that such embodiment may be modified in arrangement and detail without departing from the invention. I claim all modifications which come within the spirit and scope of the following claims.

I claim:

1. An apparatus for mounting tire chains on a tire having a predetermined tread diameter, comprising:
   a rectangular flat, rigid base having parallel opposite edges;
   a single pair of elongated parallel members, each parallel member extending along one of the parallel opposite edges and projecting upward from one side of the base, each of the members defining, in cross-section, a triangular shape in combination with the base;
   the parallel members being of a height and spaced apart to support the tire at an elevation above the base such that a cross-linking member of a tire chain can be movably positioned between the pair of parallel members, the tire chain being spread on a support surface also supporting the base and an approaching tire;

the parallel members each having an upwardly-projecting angular apex of a predetermined height from the base and the base having a predetermined thickness providing a combined height from the support surface such that the tread of the tire approaching one of the parallel members transversely of the length thereof initially engages the apparatus in the area generally at the apex of said one member, said one member being oriented so that the apex grips the tire tread and frictionally engages the apparatus against the support surface to fix the apparatus in place so that the tire can roll onto the apparatus and be elevated and supported by the two parallel members above the base, the cross linking member of the tire chain remaining movable therebetween;

the parallel members being so disposed that the parallel members will nest together when a pair of apparatus are placed together with the one sides of their bases in facing relation with one parallel member of one of the pair of apparatus disposed between and adjacent to the two parallel members of the other of the pair of apparatus; and means for mounting a jack on the other side of the base.

* * * * *